United States Patent [19]

Curry

[11] Patent Number: 4,697,704
[45] Date of Patent: Oct. 6, 1987

[54] STORAGE CONTAINER FOR FLOPPY DISCS

[75] Inventor: Martin W. Curry, Jacksonville, Fla.

[73] Assignee: Royal Master Systems, Inc., Jacksonville, Fla.

[21] Appl. No.: 880,040

[22] Filed: Jun. 30, 1986

[51] Int. Cl.⁴ .............................................. B65D 85/30
[52] U.S. Cl. .................................... 206/444; 206/454; 206/45.2; 220/345; 220/346; 220/212
[58] Field of Search .............. 206/444, 311, 454, 456, 206/45.2, 45.23; 220/331, 345, 346, 212, 337, 338

[56] References Cited

U.S. PATENT DOCUMENTS 4,162,006 7/1979 Wilson .................................. 206/444
4,162,007 7/1979 Bothun et al. ....................... 206/444

Primary Examiner—Stephen Marcus
Assistant Examiner—Michael J. Shea
Attorney, Agent, or Firm—Arthur G. Yeager

[57] ABSTRACT

A generally cubical container with a vertical open front selectively closed by a removably attachable hinged cover, spaced aligned parallel slots on the upper and lower walls inside the container to receive floppy discs standing on edge in the slots, the cover having stub shafts to slide into and seat in a first pair of grooves on the outside of the container to close the container or alternatively to slide into and seat in a second pair of grooves to form a support base for the container to provide a slight downward inclination from front to rear to maintain the discs in the container by gravity and to facilitate insertion of discs into the container.

15 Claims, 15 Drawing Figures

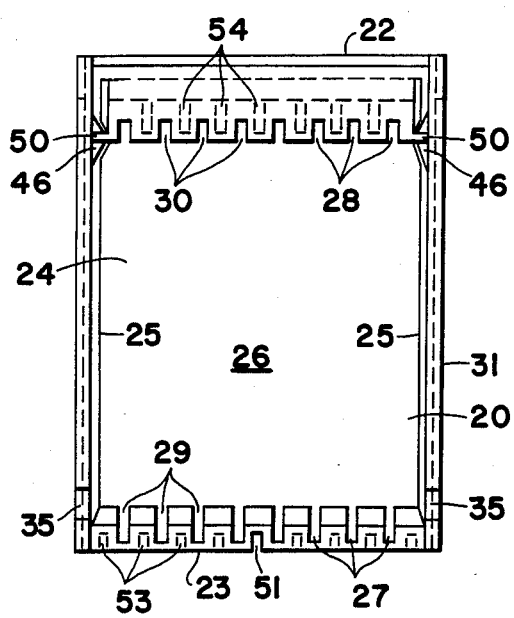

STORAGE CONTAINER FOR FLOPPY DISCS

BACKGROUND OF THE INVENTION

"Floppy discs" is the well known term to describe circular thin flexible computer discs that contain computerized information. This information may be an organized program which causes the computer screen to show directions that the computer operator must follow in order for the computer to perform certain tasks. The information may also be merely a mass of data which has been collected by the computer operator and is now to be supplemented, amended, or otherwise used. Each floppy disc must be maintained in a dust jacket to keep it clean and labeled for identification. Generally, a computer operator will collect at least 5-10 floppy discs after a brief period of working with a computer and will continually be changing from one disc to another as different tasks are presented to the operator. In the past the floppy discs in their separate dust jackets were kept in a drawer or pigeonhole in no organized fashion, and each change from one disc to another required a shuffling through many covered discs to find the one needed next and returning it eventually to its storage place in its dust jacket. This is a frustrating and needless waste of time by the operator.

It is an object of this invention to provide a novel container for floppy discs. It is another object of this invention to provide a clean, convenient, efficient storage for a plurality of floppy discs. Still other objects will become apparent from the more detailed description which follows.

BRIEF SUMMARY OF THE INVENTION

This invention relates to a container for floppy discs comprising a container body of generally rectangular prismoidal shape having an upper horizontal wall, a lower horizontal wall, two vertical side walls, a rear vertical wall, and an open front selectively coverable by a hinged front cover, the interior of said container body having a first plurality of spaced parallel slots parallel to said side walls and positioned along said lower wall with the open portion of said slots facing upward and extending from said open front to adjacent said rear wall and a second plurality of spaced parallel slots parallel to said side walls and positioned along said upper wall with the open portion of said slots facing downward and extending from said open front to said rear wall and in general alignment with the respective open portions of the slots of said first plurality; said cover being generally rectangular and of a size to cover said open front and being removably attachable to said container body so as to pivot from a closed position covering said open front to an open position wherein the entire open front is uncovered.

In specific embodiments of this invention the cover has two stub shafts which are selectively engageable in either of two grooves on the container surface whereby the cover can be pivoted to open or close the front of the container when attached to one pair of grooves and can be used as an inclined support base for the container when attached to another pair of grooves.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a front elevational view of the container body;

FIG. 4 is a side elevational view of the container body;

FIG. 5 is a top plan view of the cover;

FIG. 6 is a side elevational view of the cover;

FIG. 7 is a bottom plan view of the cover;

FIG. 8 is a top plan view of the shaft seat strip;

FIG. 9 is a side elevational view of the shaft seat strip;

DETAILED DESCRIPTION OF THE INVENTION

Figure 1:
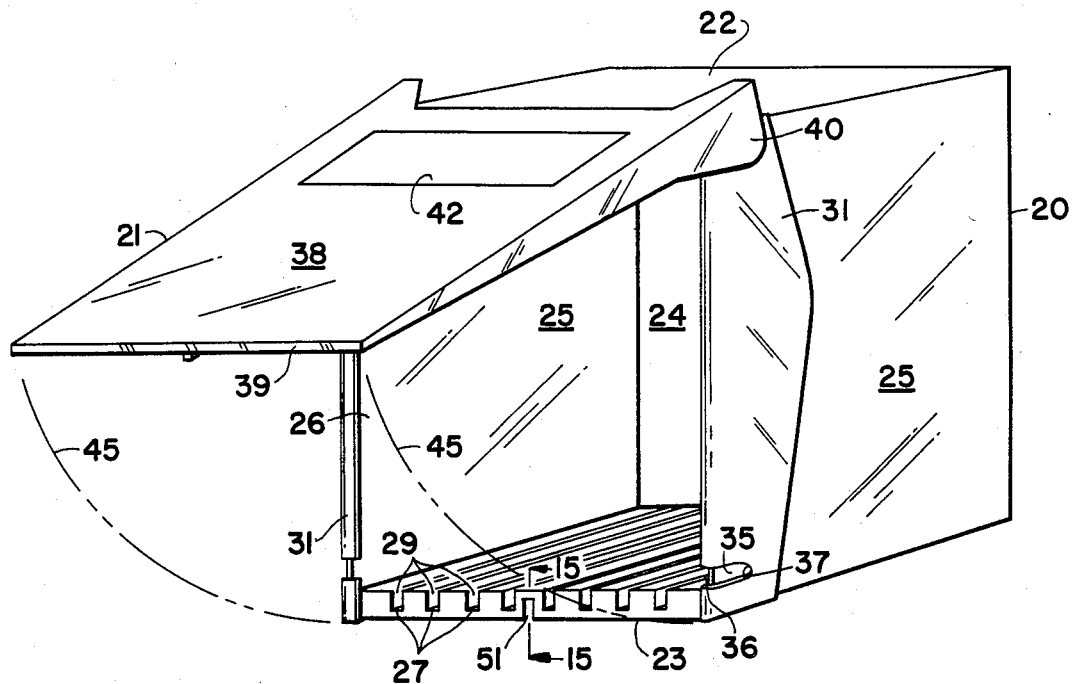
FIG. 1 is a perspective view of the container of this invention showing the cover pivoted to open or close the container.

The container of this invention may be seen in its fully assembled and operational form in FIGS. 1-7. Container body 20 is a rectangular prismoidal shape, which in one preferred form is substantially cubical. Container body 20 has an upper horizontal wall 22, a lower horizontal wall 23, a rear vertical wall 24, two vertical sidewalls 25 and a vertical open front 26. Cover 21 is removably attachable to container body 20 to function as a cover for open front 26 and may be swung along path 45 to leave front 26 open or closed.

Inside of container body 20 are two sets of grooves for holding floppy discs in a vertical position standing on edge. A first plurality of grooves 27 lies on lower wall 23 with grooves 27 running lengthwise parallel to each other and to vertical sidewalls 25. Grooves 27 have an open side 29 facing upward, and they extend from open front 26 to adjacent rear wall 24. In a similar but opposing fashion, there is a second plurality of grooves 28 lying along upper wall 22. Grooves 28 are parallel to each other and to sidewalls 25, and they extend from open front 26 to adjacent rear wall 24. Open sides 30 of grooves 28 face downwardly toward grooves 27 and are respectively aligned vertically with grooves 27. It will be appreciated that with such alignment a floppy disc may be supported on edge in two such respective grooves.

Figure 2:
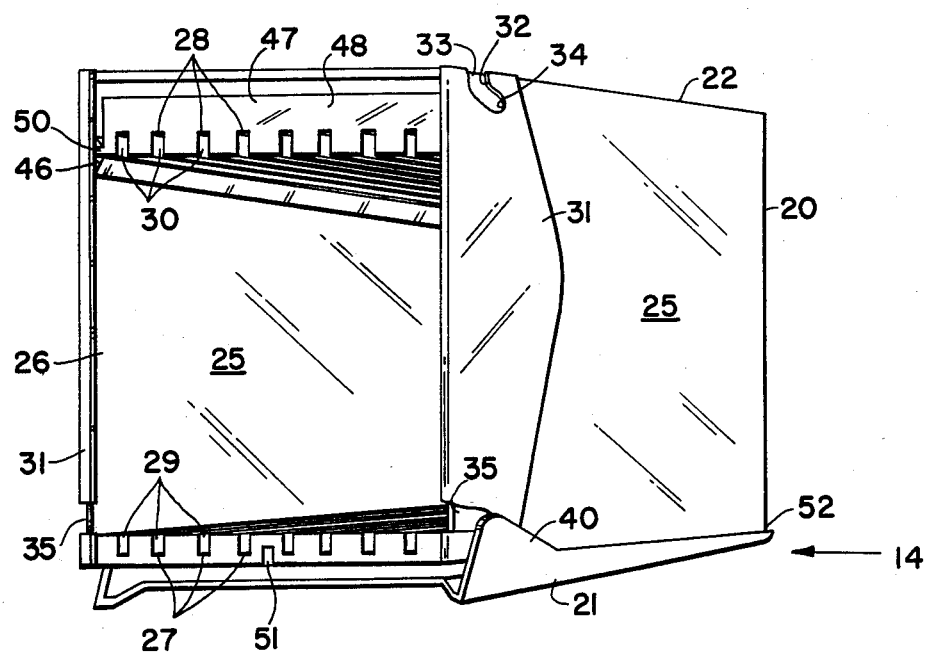
FIG. 2 is a perspective view of the container of this invention showing the cover attached to the bottom of the container as an inclined support base.
Figure 10:
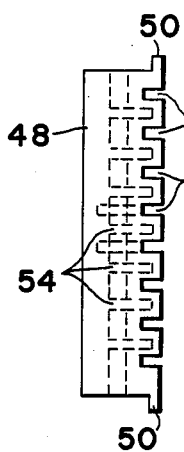
FIG. 10 is a front elevational view of the upper groove unit.
Figure 11:
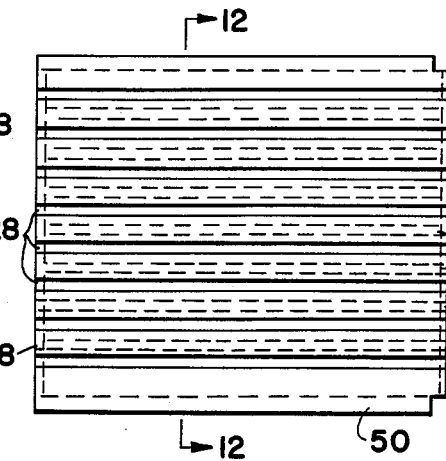
FIG. 11 is a top plan view of the upper groove unit.
Figure 12:
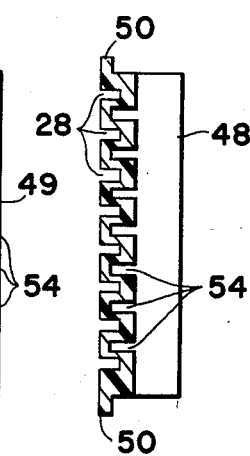
FIG. 12 is a cross sectional view taken at 12—12 of FIG. 11.
Figure 13:
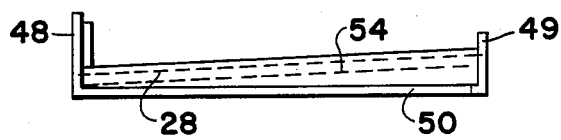
FIG. 13 is a side elevational view of the upper groove unit.

On the outside of sidewalls 25 adjacent open front 26 there is a shaft seat strip 31. Each strip 31 has two grooves 32 and 35 which serve to hold cover 21 in each of its two operating positions. Upper groove 32 is positioned adjacent open front 26 and upper wall 22. As illustrated in FIGS. 1 and 2, a preferred embodiment has upper groove with an open end 33 with a vertical entrance at upper wall 22 and a closed end 34 positioned downwardly and rearwardly from open end 33. According to this embodiment, lower groove 35 is adjacent open front 26 and lower wall 23. Open end 36 of groove 35 is positioned at open front 26 and closed end 37 is rearward of open end 36.

Cover 21 has a front or outer face 38, a back or inner face 39, and two side arms 40 which extend rearwardly over the outside of sidewalls 25 substantially at right angles from faces 38 and 39. Facing each other on the inside of arms 40 (not seen in FIGS. 1 and 2 but visible in FIGS. 5-7) are two short stub shafts 41 aligned with each other. Shafts 41 are adapted to slide into grooves 32 and 35 and be seated in closed ends 34 and 37. On the outside face 38 there is an area 42 which has been prepared, as by smoothing or lightly roughening, to receive an adhesive coated identification label to describe the contents. As shown in FIG. 1 cover 21 may be engaged with upper grooves 32 and be pivotable to any open position or closed against container body 20. In FIG. 2 there is shown a second position for cover 21 in which it is engaged by lower groove 35 and pivoted rearwardly and under container 20 to lie against lower wall 23 and form a support base for container body 20 with open front 26 tilted slightly upward with respect to rear wall 24 so that the floppy discs in grooves 27 and 28 will not tend to roll out of container body 20 and may be easily inserted therein.

In FIGS. 3-4 it may be seen that weight reducing voids 53 and 54 are employed and interspersed with grooves 27 and 28, respectively.

In FIGS. 5-7 there are shown tabs 43 and 44 projecting outwardly from inner surface 39 of cover 21. There tabs are shaped and positioned to function as snap-closure structures to maintain cover closed against container body 20 in each of the positions shown in FIGS. 1 and 2. Tab 43 is positioned to fit into recess 51 to hold cover 21 closed against open front 26. Tab 44 is positioned to engage the corner formed by the intersection of rear wall 24 and lower wall 23 when cover 21 is in the position shown in FIG. 2.

Cover 21 is attachable to container body 20 by means of stub shafts 41 sliding into a pair of upper grooves 32 or a pair of lower grooves 35. It may be seen that shaft seat strip 31 is a thin piece of material approximately the same thickness as the length of stub shafts 41. Grooves 32 and 35 pass through walls 25. In this manner stub shafts may be slid into groove openings 33 or 36 and pushed into seating at closed ends 34 and 37, respectively, and will be snugly seated there and yet easily pivoted.

It is preferred that container body 20 and cover 21 be injection molded of a suitable plastic material, e.g., polyolefin, polyester, polyacetal, polycarbonate, polyamide, polyvinyl, acrylic, and the various blends and copolymers associated therewith. Suitable tapering and draft must be employed to allow the molded object to be easily removed from the mold. Such has been shown in FIGS. 3 and 4 where open front 26 is slightly larger in area than rear wall 24 with the connecting corners tapered or inclined therebetween. In this embodiment it is preferred that grooves 27 and the associated structure be integrally molded with the structure of walls 22, 23, 24, and 25, while grooves 28 and their associated structure be molded as a separate unit 47 and assembled later to container body 20. This arrangement also makes it more convenient to employ weight reducing voids 53 and 54 so as to reduce the cost of the final structure.

By separately molding several pieces of the container body 20 and assembling the pieces into a single structure, the molding process can be simplified. Container body 20 can be preferably manufactured by separately molding the five-walled container with grooves 27 along the bottom wall 23 as one unit, two shaft seat strips 31 as mirror images of each other, and one upper groove structure 47 as one unit. These four items are then adhesively joined together to produce a container body 20. Cover 21 is also separately molded as a unit and then is attached to container body 20 as needed.

In FIGS. 8 and 9 there is shown one of shaft seat strips 31, in this case the one shown in FIG. 1. A second strip 31 is needed for the opposite side of container body 20 and would be a mirror image of the one shown. Each strip is molded with grooves 32 and 35 as shown and, preferably, with a lip 55 which forms a convenient indexing guide for assembling strips 31 to sidewalls 25.

In FIGS. 10-13 there is shown upper groove structure 47 with a front wall 48 and a rear wall 49, grooves 28 and weight reducing voids 54. For ease and accuracy in assembling structure 47 to container body 20, the latter is molded with a groove 46 extending from open front 26 to rear wall 24 (see FIGS. 1-2). Structure 47 is molded with flanges 50 to slide into grooves 46 with rear wall 49 abutting into rear wall 24 of container body 20. Adhesive is employed between rear wall 24 and rear wall 49 to maintain structure 47 in place. Thus, with three pieces molded to the base container structure, the final container body is easily produced. It is, of course, to be understood that other routes to the manufacture of container body 20 may be followed without departing from the essence of this invention.

Figure 14:
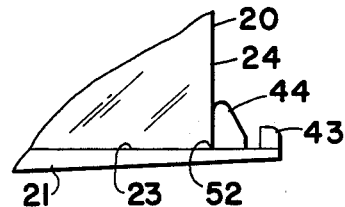
FIG. 14 is a partial side elevational view taken in the direction of arrow 14 of FIG. 2.
Figure 15:
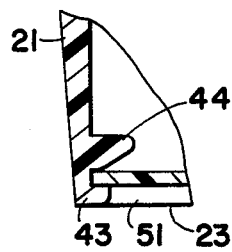
FIG. 15 is a cross sectional view taken at 15—15 of FIG. 1 when the cover is closed.

In FIGS. 14 and 15 there are shown the ways in which cover 21 is clamped to contained body 20. In FIG. 14, cover 21 is in position as the supporting base under lower wall 23 as shown in FIG. 2. Tab 44 snap fits around corner 52 which is the intersection of lower wall 23 and rear wall 24. In FIG. 15, tab 43 is shown inserted into recess 51 in the middle of the front edge of lower wall 23. In this position cover 21 fits snugly over open front 26 closing the entire opening.

Container 20 and cover 21 form an excellent storage for floppy discs without need of dust covers, since cover 21 will perform that function for all discs in the container. The number of slots 27 and 28 may obviously be increased or decreased for various embodiments of this invention. Eight pairs of slots are shown here to house eight floppy discs. With more than eight slots the container 20 and cover 21 will become a wider rectangular shape, but will function equally well in all other regards. Eight appears to be a convenient number since it provides a structure that is substantially cubical. Spacing between adjacent slots 27 or 28 is maintained at that which is convenient for inserting a finger or thumb to grasp a disc.

As mentioned previously, when cover 21 is attached as a supporting base as shown in FIG. 2, it is desirable to have it structured to raise lower wall 23 to a higher elevation at open front 26 than at rear wall 24. This provides an inclination to grooves 27 and 28 tapering downwardly toward rear wall 24. By this means, discs will not inadvertently roll out the front but will remain in place.

While the invention has been described with respect to cerain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A container for storing a plurality of computer software discs standing on edge in spaced parallel arrangement, comprising a generally cubical rigid container body having an upper horizontal wall, a lower horizontal wall, a rear vertical wall, two vertical side walls, and a vertical open front, a first plurality of spaced grooves parallel to said side walls along said bottom wall having their open sides facing upwardly and extending from adjacent said rear wall to said open front, a second plurality of spaced grooves parallel to said side walls along said upper wall having their open sides facing downwardly and extending from adjacent said rear wall to said open front and being in general vertical alignment with said first plurality of spaced grooves respectively, said grooves being slightly larger in width than the thickness of said discs, a shaft seat strip on the outside of each said side wall adjacent said open front and extending from said upper wall to said lower wall, each strip having an upper groove with an open end adjacent the juncture of said open front and said upper wall and a closed end downwardly from said open end and a lower groove with an open end at said open front adjacent said lower wall and a closed end rearwardly from said open end, and a removably attachable pivotable cover having a front surface and a back surface and adaptable to fit snugly against and be coextensive with said open front, said cover having two sidearms extending rearwardly at substantially right angles from said back surface each said sidearm having a short stub cylindrical shaft directed toward and aligned with the other respective said stub shaft, each said shaft having a diameter substantially equal to the width of said grooves in said shaft seat strips.

2. The container of claim 1 wherein said cover additionally includes a tab projecting outwardly from the back surface thereof and adapted to engage a cooperating structure on said container body to effectuate a snap fit closure to hold said cover against said container body.

3. The container of claim 2 wherein said cooperating structure is a recess in said container body to close said cover over said open front when said stub shafts are pivotally engaged in said upper groove of said shaft seat strip.

4. The container of claim 2 wherein said cooperating structure is an outside corner at the intersection of said rear wall and said lower wall when said stub shafts are pivotally engaged in said lower groove of said shaft seat strip.

5. A container for floppy discs comprising a container body of generally rectangular prismoidal shape having an upper horizontal wall, a lower horizontal wall, two vertical side walls, a rear vertical wall, and an open front selectively coverable by a hinged front cover, the interior of said container body having a first plurality of spaced parallel slots parallel to said side walls and positioned along said lower wall with the open portion of said slots facing upward and extending from said open front to adjacent said rear wall and a second plurality of spaced parallel slots parallel to said sidewalls and positioned along said upper wall with the open portion of said slots facing downward and extending from said open front to said rear wall and in general alignment with respective said open portions of said slots of said first plurality, and a generally rectangular cover of a size to overlie said open front, said cover including a pair of spaced arms extending rearwardly over outer surfaces of said respective side walls adjacent said upper wall, pivot means for connecting said cover to said container body so as to pivot from a closed position covering said open front to an open position wherein said open front is substantially completely uncovered, said pivot means including a pair of stub shaft portions oppositely facing and aligned with and extending inwardly toward each other, and a pair of upper elongated grooves extending from an opening adjacent said upper wall downwardly to a seat spacedly below said upper wall on said container body adjacent respective side walls and said open front, each said upper groove being adapted to receive a respective said stub shaft slidable along said upper groove from its said opening to a pivotable position at its said seat.

6. The container of claim 5 wherein said body includes a pair of lower grooves positioned adjacent said respective side walls adjacent said lower wall and said open front with said cover stub shafts disposed respectively therein, said cover supporting said container body with said lower wall resting on said cover.

7. The container of claim 6 wherein said cover includes a snap closure means for selectively maintaining said cover in a closed position on said body.

8. The container of claim 7 wherein said cover includes another snap closure means for selectively maintaining said cover in underlying condition against said lower wall.

9. The container of claim 6 wherein said cover includes a snap closure means for selectively maintaining said cover in underlying condition against said lower wall.

10. The container of claim 6 wherein said open front is disposed higher than said rear wall and said slots are slightly inclined downwardly from adjacent said open front to adjacent said rear wall when said container body rests on said cover.

11. A container for floppy discs comprising a container body of generally rectangularly prismoidal shape having an upper horizontal wall, a lower horizontal wall, two vertical side walls, a rear vertical wall, and an open front selectively coverable by a hinged front cover, the interior of said container body having a first plurality of spaced parallel slots parallel to said side walls and positioned along said lower wall with the open portion of said slots facing upward and extending from said open front to adjacent said rear wall and a second plurality of spaced parallel slots parallel to said side walls and positioned along said upper wall with the open portion of said slots facing downward and extending from said open front to said rear wall and in general alignment with the respective said open portions of said slots of said first plurality, and a generally rectangular cover of a size to overlie said open front, pivot means for detachably connecting said cover to said container body so as to pivot from a closed position covering said open front to an open position wherein said open front is substantially completely uncovered, said pivot means including an aligned pair of stub shafts attached to and extending inwardly of said cover, and an aligned pair of open-ended slots formed and carried by said body adjacent said open front and upper wall within which are disposed respective said stub shafts, said body having another aligned pair of open-ended slots adjacent said open front and lower wall, said pair of stub shafts being detachably connected to and within respective said other pair of slots to dispose said cover as a base support for said container body resting with said lower wall below and supported by said cover.

12. The container of claim 11 wherein said container with said cover attached as said base support and resting on a horizontal surface disposes said open front higher than said rear wall and said slots in a slightly inclined angle with the ends of said slots adjacent said open front being higher than the ends of said slots adjacent said rear wall.

13. The container of claim 11 wherein said cover includes a snap closure means for selectively maintaining said cover in a closed position on said body.

14. The container of claim 13 wherein said cover includes another snap closure means for selectively maintaining said cover in underlying condition against said lower wall.

15. The container of claim 13 wherein said cover includes a snap closure means for selectively maintaining said cover in underlying condition against said lower wall.

* * * * *